March 27, 1945. E. M. S. McWHIRTER ET AL 2,372,593
TELEMETERING SYSTEM
Filed Nov. 24, 1942 7 Sheets-Sheet 3

Fig. 3.

INVENTORS
ERIC M. S. McWHIRTER
CYRIL H. CHAMBERS
BY ATTORNEY

Patented Mar. 27, 1945

2,372,593

UNITED STATES PATENT OFFICE 2,372,593

TELEMETERING SYSTEM

Eric Malcolm Swift McWhirter and Cyril Herbert Chambers, London W. C. 2, England, assignors to International Standard Electric Corporation, New York, N. Y.

Application November 24, 1942, Serial No. 466,818
In Great Britain July 17, 1941

10 Claims. (Cl. 177—351)

This invention relates to an arrangement for indicating at a distance the number of units of a quantity recorded on a meter. Arrangements are known in which a meter closes and opens contacts each time a unit of quantity is recorded thereon and thus sends an impulse to a distant point to enable a similar record to be kept at that point. This known arrangement, however, involves one line for each meter.

According to the present invention an arrangement for indicating at a distance the number of units recorded on a meter comprises means for causing the said meter to operate a register device once for each unit recorded on the meter during a given interval of time and means automatically operable at the end of said interval for transmitting the number stored on said register device to a distant station.

This enables the meter reading to be sent in a code form and the sending can take place in a brief interval of time thus enabling the line to be used for other purposes when not required for sending and/or allowing the readings of more than one meter to be sent over the same line.

Preferably two register devices are provided and the meter sends impulses at a rate controlled by the meter reading into one register device during a given interval, conditions are then automatically changed so that the number registered is sent to the distant point and the meter during a second interval is sending impulses into the second register device.

The invention itself and various advantages and subordinate features thereof will be better understood from the following description of one embodiment thereof taken in conjunction with the accompanying drawings. The embodiment to be described is for sending the readings of megawatt-hour meters at a substation to a central station. Referring to the drawings, all the figures, except Fig. 5, are parts of the one circuit diagram.

Figure 4A:
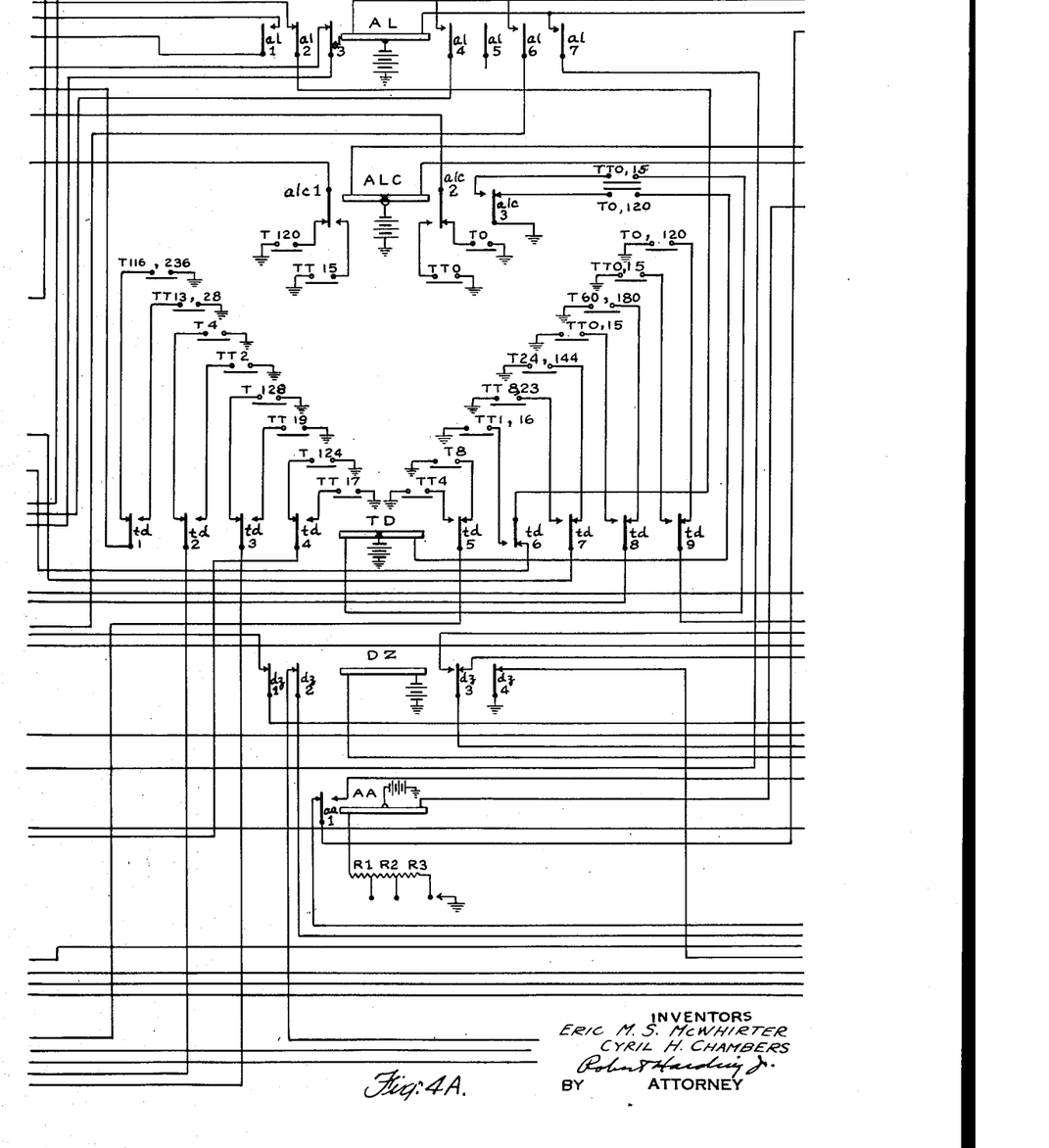
Figs. 4A, 4B and 4C, which should be placed in succession to the right of Fig. 3, show arrangements for automatically altering the durations of the intervals of time at which sending of a registered amount takes place together with arrangements for automatically changing over the connections of the two register devices from export to import and vice versa and initiating the sending of an indication to that effect to the central station.
Figure 4B:
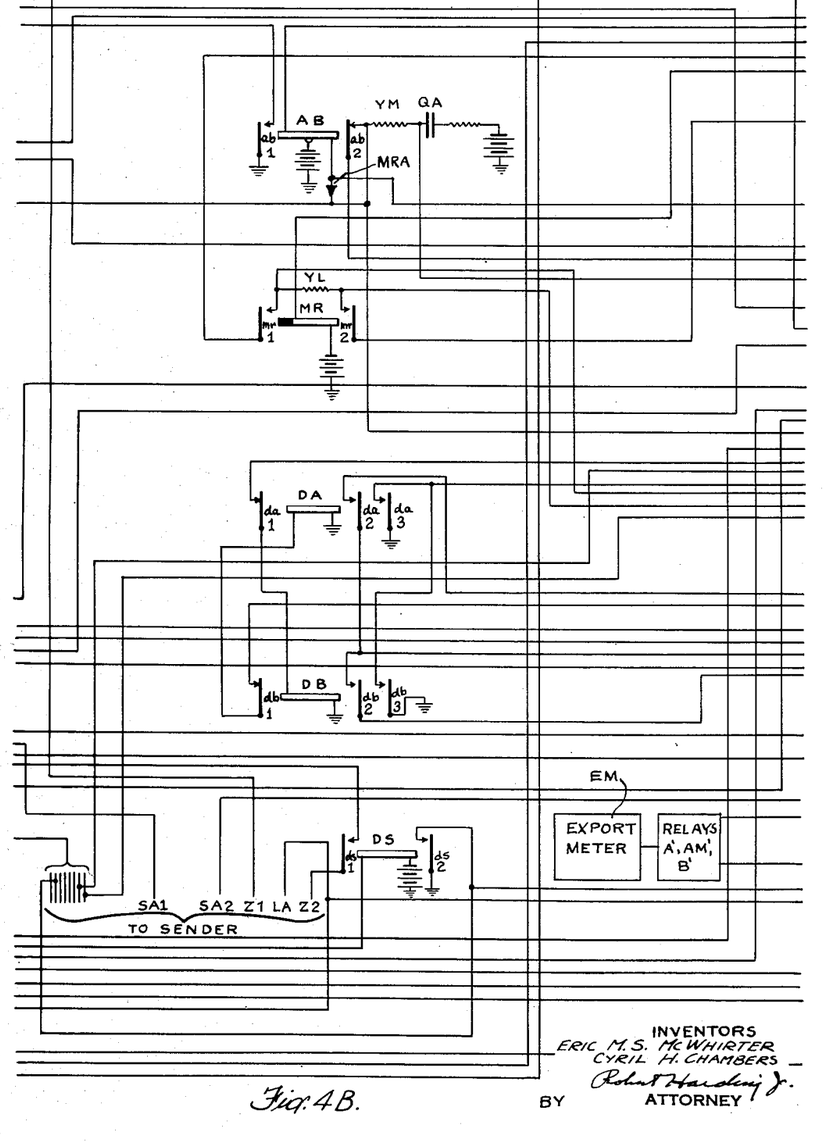

Below Fig. 4B there is assumed to be connected a sender common to a plurality of sets of meters and a sender finder by means of which the sender connects itself to the circuits shown. Such a sender as disclosed in Patent No. 1,907,087 issued on May 2, 1933, to M. L. Nelson may be used for this purpose.

The relays W and CO, (Fig. 3), ALC and TD, (Fig. 4A), and DR and DD, (Fig. 4C), have two windings each, with contacts arranged to be moved into the positions shown by energization of the left winding and into the opposite positions by energization of the right winding, the contacts remaining in either positions even though the winding which moved them has been deenergized. These relays have been indicated with a cross at the center.

The contacts marked T and TT in the several figures of the drawings are contacts operated by time switches driven by the same motor. The numbers marked against these contacts are the number of seconds after the commencement of a cycle at which they are closed. Time switch T has a complete cycle of four minutes whilst time switch TT has a complete cycle of half a minute. The switch T passes through position O when TT also passes through position O. Switch T closes for 4 seconds, whilst switch TT closes for 1 second.

The normal cycle of the apparatus is the four minute cycle and this will first be described. It is assumed that the station concerned is drawing power from the grid and therefore that the meter being actuated is an import meter, shown at IM in Fig. 2. In this condition the contacts of the relays are as shown in Figs. 4A, 4B and 4C. It is also assumed that the T contacts, (Fig. 4A), have just closed at time O and have operated relay CO, Fig. 3, over its left winding, and $alc2$ back, whereupon its contacts are moved into the positions shown in the drawings.

*Registering import meter impulses*

Figure 1:
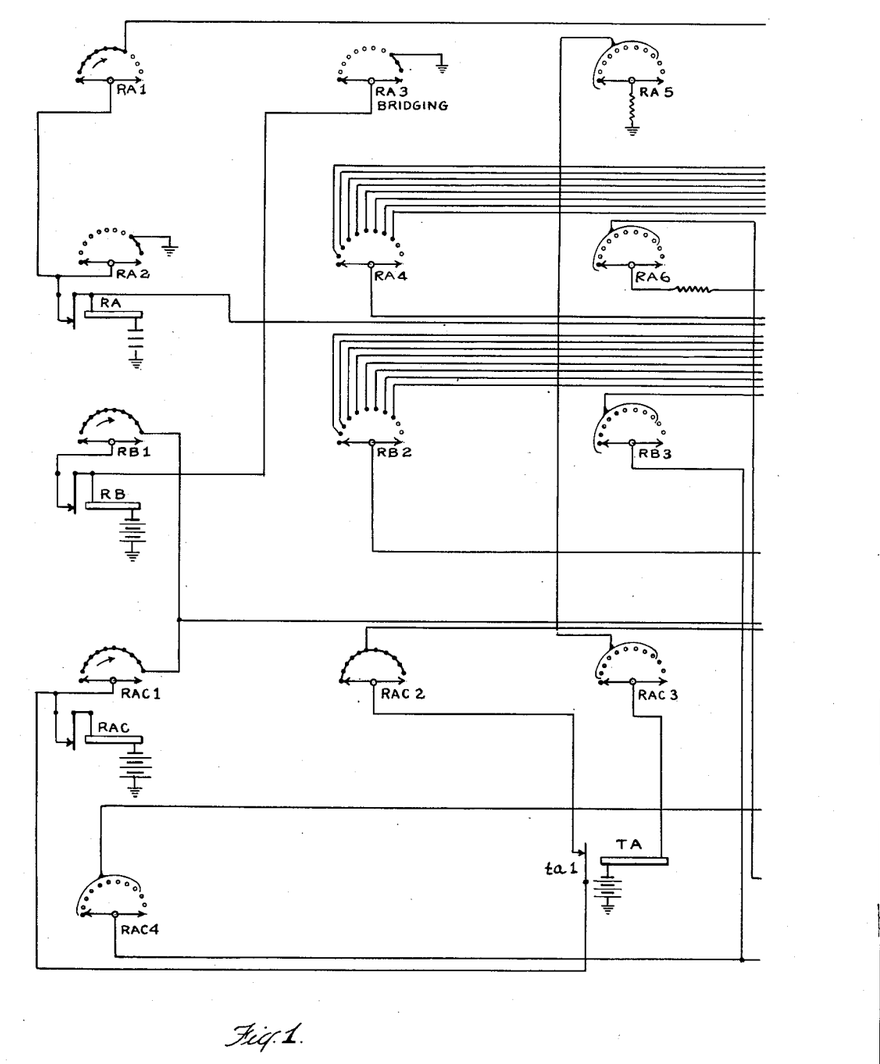
Fig. 1 shows one register device, Fig. 2, which should be placed to the right of Fig. 1, shows a second register device, and also the arrangement for sending impulses from one meter into one or the other register device.
Figure 2:
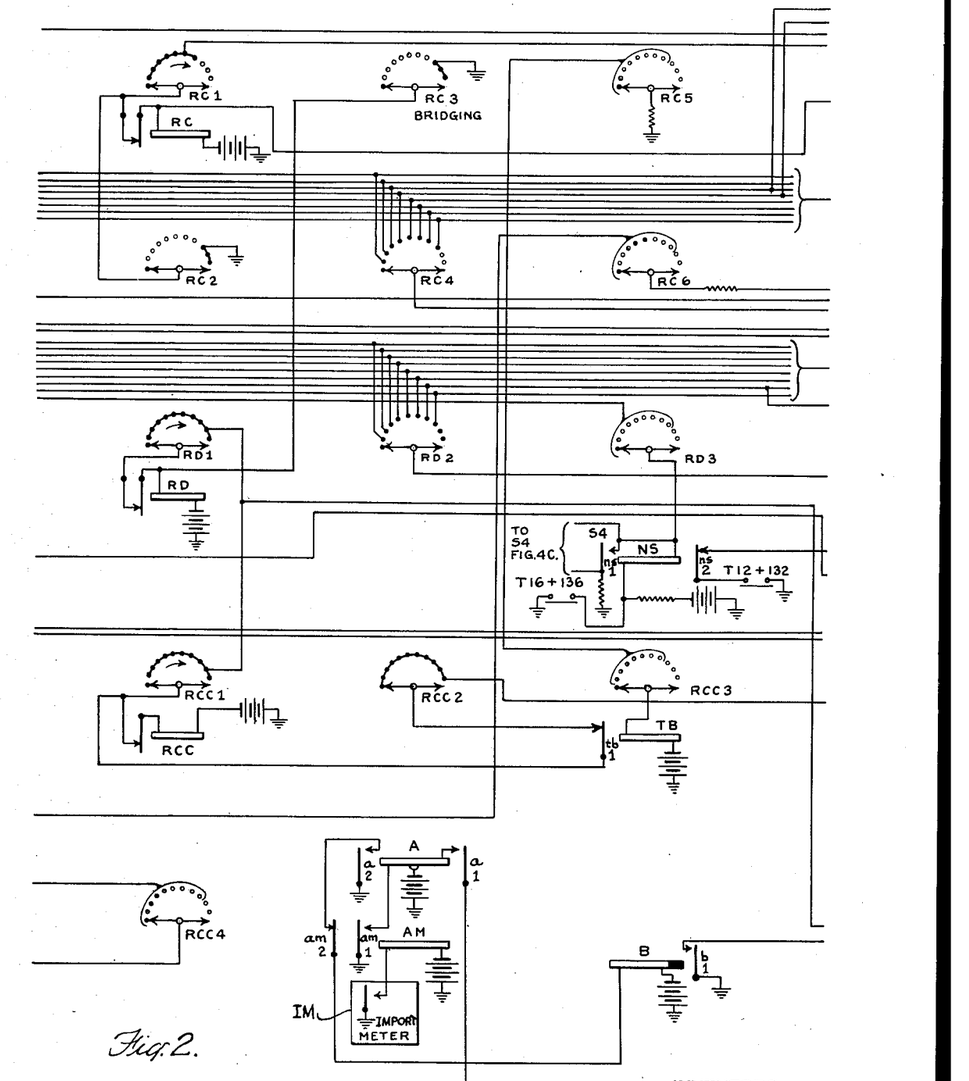

The meter contacts of the import meter IM shown in Fig. 2 close repeatedly at a rate determined by the meter reading and operate relay AM. At contacts $am1$ relay A is operated over its left hand winding and locks over its right hand winding and contacts $c1$ back $a1$ front. Contacts $a2$ operate relay B when the meter contacts again open and relay AM releases. Relay B, which is slow to release, closes contacts $b1$ and operates relay C. A circuit is then closed for magnet RA (Fig. 1) over contacts $co2$, $dd1$ and $c2$ front. At contacts $c1$ the locking circuit of A is broken and A releases opening at contacts $a2$ the circuit of relay B which releases after an interval and releases relay C. When contacts $c2$ open, magnet RA steps the wipers RA1 ... RA6 on to their first contacts. Each impulse from the meter thus steps switch RA one step.

When switch RA has taken eight steps brush RA3 on contact No. 8 completes a circuit for magnet RB, whilst a circuit for magnet RA is completed over brush RA2. Switch RA goes to home position and switch RB takes one step. Thus for each 8th step of RA, RB takes a step.

At the end of a two minute period, contacts T120 (Fig. 4A) close and relay CO is operated over its right winding and changes its contacts over to the alternate positions from these shown. At 124 seconds a circuit is completed for magnets RD and RCC, Fig. 2, whichever is out of normal position, over wipers and contacts RD1 and RCC1 respectively to return these switches to normal position. Impulses from contacts $c2$, Fig 4C, are sent over contacts $dd1$, $co2$ to magnet RC which steps its wipers in the same way as RA was previously stepped and at each 8th step returns to home position and steps RD one step.

Sending meter reading to central station

The sending of the amount registered on switches RA and RB during the first two minutes interval takes place during the second two minutes interval, and the various steps take place in time sequence.

At 132 seconds contacts T in Fig. 2 marked T12 and 132 close and complete a circuit for magnet RST over $ns2$, back, $td6$ back, $al2$ back, home contacts and wiper RST1, interrupter contacts, magnet RST, and switch RST steps its wipers on to contacts Nos. 1. Relay ST then operates over RST3 and $z1$ back, and at contacts $st1$ connects battery to the lead LA, and so to a start circuit for a sender finder. This sender finder and its associated sender are not shown as they are of a kind well known in automatic telephone systems. When the sender finder brings one of its wipers on to a contact to which lead SA1 is connected it meets the battery connected thereto over winding of MS and contacts $st2$ front, stops, and connects ground to the SA1 lead (Fig. 4) to operate relay MS, and a relay in the sender. This relay starts the sender into operation to send impulses to the central station. A preparatory impulse to prepare the receiver at the central station and then a set of impulses representing the particular contact on which the sender finder has stopped are first sent, these latter denoting the identity of the particular meter concerned, after an interdigital pause the switch in the sender then proceeds to send out impulses representing the registered meter reading and these impulses are sent until a marked contact is reached. This contact is marked over $ms1$ front, Fig. 3, wiper RST2 and contact No. 1, contacts $co4$ back, Fig. 3, wiper and contact of RD2, wire of the multiple, contacts $w2$ in position showing, $kz1$ back to sender. When the sender switch reaches the marked contact it stops and applies ground to the lead marked Z1, Fig. 4B. This operates relay Z (Fig. 3) over $ms3$ front. Contacts $z1$ break the circuit of ST, and energise magnet RST over $al3$ back and $z1$ front. Contacts $st2$ opening release MS, and contacts $ms3$ opening release Z. Z in releasing breaks the circuit of magnet RST which steps its wipers on to contacts Nos. 2 and ST re-operates, reconnecting MS to the sender. The sender, when ready to send the next set of impulses, removes ground from lead Z1 and reconnects ground to lead SA1, Fig. 4B, to operate MS. Relay KZ operates over wiper RST4, contact No. 2 and $z2$ back. A marking ground is now connected over $ms1$ front, wiper and second contact of RST2, contacts $co3$ back, Fig. 3, wiper and contact of RC4, a wire of the multiple, $w1$ back, $kz1$ front, and the sender, on reaching the marked contact, stops and applies ground to lead Z1. Relay Z re-operates, again releasing ST and causing wipers of RST to take another step. Magnet RST is then operated over its own interrupter contacts and RST1 and the wipers return to home position. Relays MS and KZ release.

Shortly before the end of the second two minutes intervals contacts T marked 116 and 236 in Fig. 4A close and operate magnet RA over its own interrupter contacts and wiper RA1, contacts $co1$, $td1$ back, to return the wipers of RA to normal position ready to receive meter impulses in the following two minute interval.

At the end of the four minute cycle of T, contacts T0 in Fig. 4A again close and operate CO over its left winding and $alc2$ back to reverse its contacts again to the positions shown, and the same sequence of events as described above takes place to send the amount registered on switches RC and RD.

Other types of meters

Figure 3:
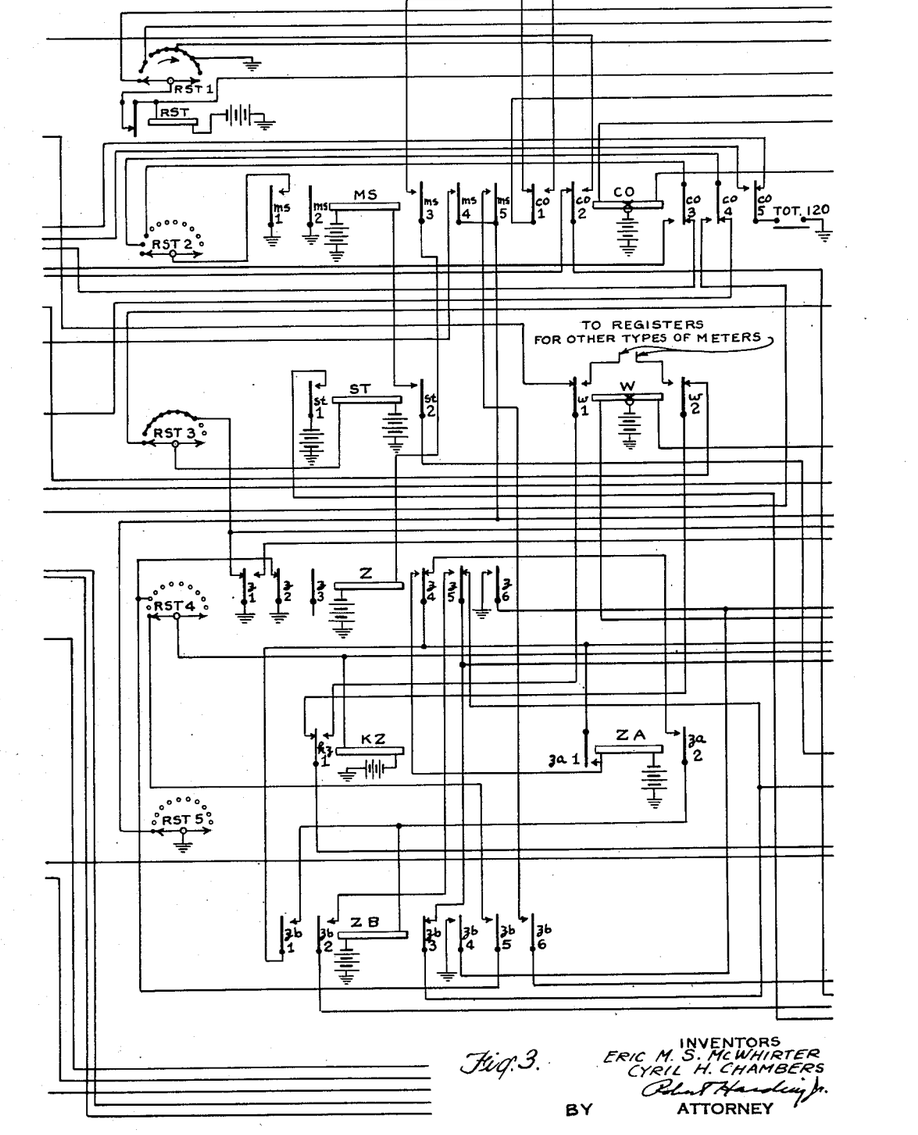
Fig. 3, which should be placed to the right of Fig. 2, shows the arrangements for initiating the sending of the amount registered in one or the other register device and for sending various conditions of the apparatus, as well as the arrangements for adjusting these conditions at stated times.
Figure 4C:
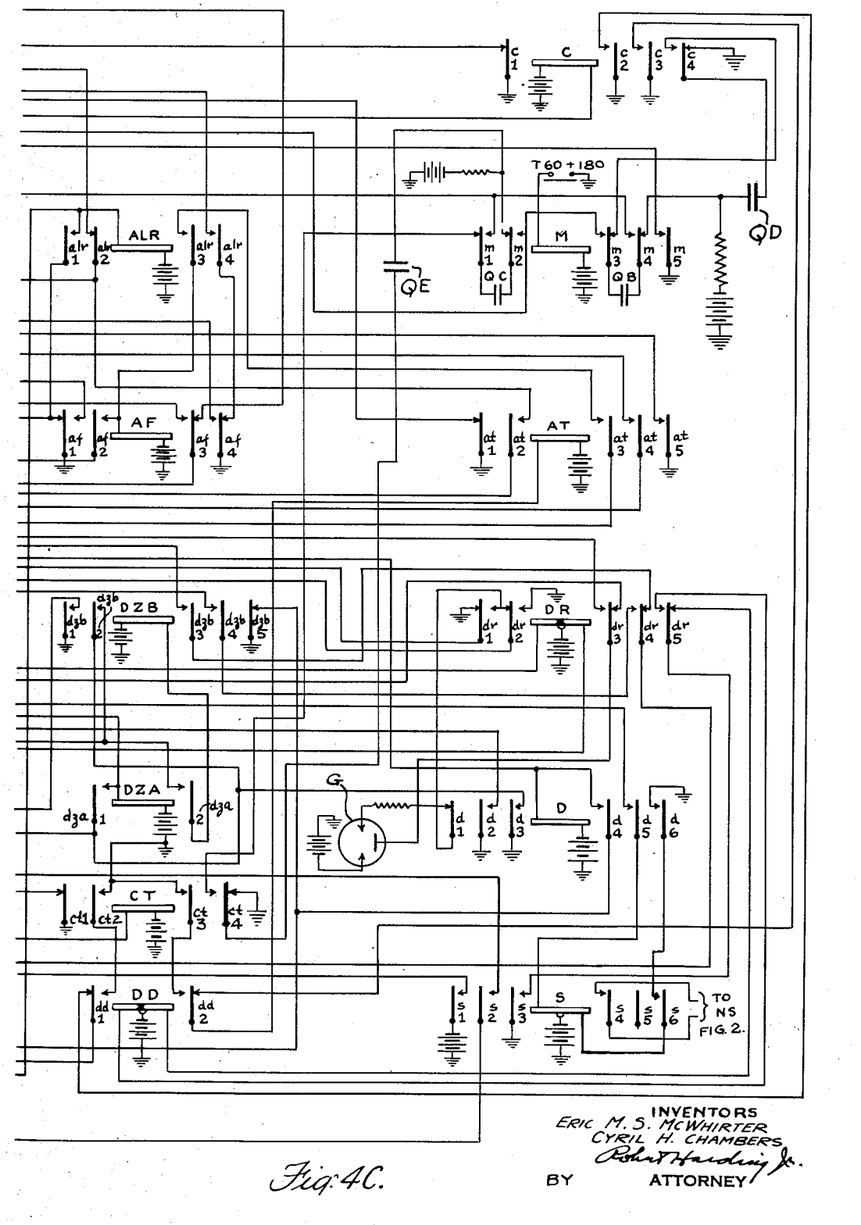
Figure 5:
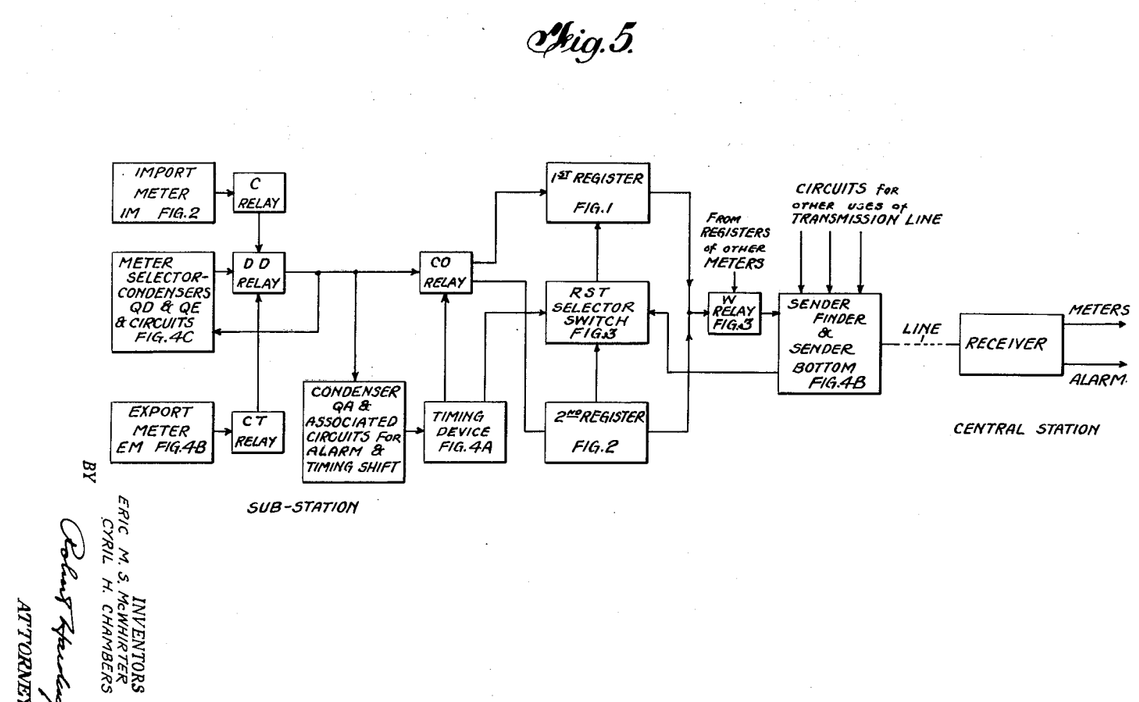
Fig. 5 is a schematic block diagram of the entire system.

Provision is made for sending to the central station in a similar manner the reading of another type of meter, e. g. a meter indicating reactive volt ampere hours (VARS) and for this purpose, relay W Fig. 3 is operated over $td7$ back from contacts marked T24 and 144 and at its contacts $w1$ and $w2$ changes over the multiple from the sender to registers for the VARS, similar to those shown in Figs. 1 and 2. At 60 and 180 seconds contacts T60 and 180 in Fig. 4A operate relay W over its left winding to reverse its contacts to the positions shown. Although contacts $w1$, $w2$ and $kz1$ have been shown as single sets of contacts it is to be understood that there is a set of contacts for each wire of the marking multiple.

Suppression of sending

The main information conveyed to the central station is the rate of operation of the meters and if in any two minute interval the reading of one register Fig. 1 is the same as that for the register set during the preceding two minute interval, sending is suppressed. In order to compare the conditions of the register switches, switches RAC and RCC are provided, and in order to make clear how the comparison is made a re-capitulation of some of the operations already given is here given briefly. At $T=0$ the recording of the meter readings on switches RA and RB commences; at $T=120$, recording starts on switch RC. At $T=124$ switches RD and RCC (Fig. 2) are returned to normal, if they were previously out of normal position. At $T=128$ magnet RAC (Fig. 1) is energised in a circuit over its own interrupter contacts, *ta1* back, wiper and contacts of RAC2, *td3* back, T128, ground. When wiper RAC3 reaches a contact marked by switch RA, relay TA operates over wiper and contact RAC3, contact and wiper of RA5, ground, and stops the drive. At $T=132$ the operation of sending commences as described above. At $T=236$ switch RA is returned to normal position over wiper, bank RA1, *td1* back, *co1* in alternate position T236, ground. At $T=0$ again, if RC and RD are now standing on the same contacts as RA and RB were respectively positioned previously there is a circuit for relay NS (Fig. 2) from battery, winding of the relay, wiper and contact of RD3, contact and wiper of RB3, wiper and contact of RAC4, contact and wiper of RC6, contacts *co5*, TO, ground. Relay NS locks over *ns1* front to ground and suppresses the operations of the switch RST at *ns2* which would otherwise take place at $T=12$. At $T=16$ NS is short circuited and releases. At $T=116$ RC is returned to normal position over its wiper RC1, *co1*, *td1* back, T116, ground. At the commencement of the interval during which the settings of RA and RB are to be sent, a comparison is again made, a circuit for NS being this time over wiper and contact of RD3, contact and wiper of RB3, wiper and contact of RCC4, contact and wiper of RA6, contacts *co5* in alternate position, T120, ground, and if NS operates and locks, the operation of RST at $T=132$ is suppressed. NS is released, if operated, at $T=136$.

*Overland alarm and change to shorter cycle*

If the rate at which the meter is being actuated exceeds a given figure an alarm is sent to the central station and the cycle is automatically changed over to 15 seconds intervals instead of two minute intervals. The rate at which the alarm is given is predetermined by the connection of ground to the left hand winding of relay AA, Fig. 4A, over a particular point of the rheostat R1, R2 and R3. The consequent current is insufficient to operate relay AA but determines the value of the additional current needed to operate that relay within a given time.

The relay C, Fig. 4C, which is operated each time a unit is received from the meter IM, operates at contacts *c3* a relay AT over *dd2* back. Contacts *at1* in opening release relay AB, and a circuit is closed from battery, condenser QA, *at4* front, *ab2* back, *at5* front to ground to charge condenser QA. At the same time relay AA is operated over *at5* front, *ab2* back. At the end of the impulse AT releases, reoperating at contacts *at1* relay AB and QA commences to discharge over resistance YM and the right hand winding of AA.

If QA at the beginning of its charging had retained only a small or no charge from the previous impulse, nothing happens, the cycle being merely repeated at each impulse. If, however, when AT next operates QA still retains a residual charge, there is a circuit as soon as contacts *at4* close for this to discharge through the right hand winding of AA. Relay AA is a very fast operating relay and if the residual charge is sufficient to operate relay AA before relay AB can release, there is a locking circuit for AB over its right winding, *at2* front, *aa1* front, *ab1* front, ground. Relay AA is maintained operated over rectifier MRA and the same circuit. There is also over the same circuit and *alr2* back a circuit for AL over its left winding. Relay AL locks over *al1* front, *z5* back, *zb3* back in parallel, *af1* back, ground.

As the alarm code has priority over the sending of a meter reading, if the latter is proceeding and RST (Fig. 3) is off normal, a circuit is closed over *al1* front and contacts 1 or 2 of RST1 to return the switch to the home position, whilst contacts *al2* open the circuit by which it is normally stepped out of its home position. Relay ST is operated over wiper RST3 and its home contact, *al4* front, *z1* back, to ground. Relay ST starts the sender finder as previously described and when battery is applied to lead SA1 and relay MS operates, ground is connected over wiper and home contact of RST5, *ms4* front to wire No. 7 of the multiple which goes over the back of *kz1* to cause the sender to send seven impulses, which is the first digit of the alarm code. When the sender applies ground to the Z1 lead at the end of this digit and relay Z operates, relay ZA operates over *z4* front, *al6* front to the same ground and locks over *za1* front. At *za2* front it prepares a circuit for relay ZB.

When Z operated it broke the circuit of ST at *z1* but these contacts do not operate magnet RST because the circuit is open at contacts *al3*.

When Z releases, relay ZB operates over *za2* front, *z4* back, *al6* front, home contact RST5, ground. Relay KZ operates over the wiper and home contact RST4, *zb5* front, *z2* back, ground and changes over the multiple as previously described. Ground is connected over wire 3 of the units multiple from the wiper and home contact of RST5, *ms5* front, *zb6* front, *af3* back. At the end of the second digit Z operates again and this time, when both contacts *z5* and *zb3* in the locking circuit of AL are open relay AL releases. Relay ALR then operates over *zb2* front, *z5* front, *af1* back, to ground, and locks over *alr1* front, *af1* back and ground. At contacts *alr2* the operating circuit for AL is broken so that a subsequent operation of AA does not result in the operation of AL.

At contacts *alr4* relay ALC is operated at *af4* back, and when contacts of TT pass through 0 or 15, relay TD operates over its left winding and changes over the various timed operations to depend upon the time switch contacts TT instead of upon T, thus causing the units recorded on the meter during each 15 second interval to be sent to the central station.

This condition persists whilst the rate of recording on the meter remains that at which an alarm is necessary. When this ceases to occur and at a received impulse, AA, Fig. 4A, does not operate before AB has released, relay AF operates over *alr3* front, *at3* front, *aa11* back, *ab1* front, ground. Relay AF locks over *af2* front, *zb4* front and ground. At contacts *af1*, relay ALR is released and relay AL operated.

Relay AL causes a code to be sent to the central station in the same manner as before, but as in this case the code is to indicate the end of the alarm condition, the units digit is 4 instead of 3 and units wire 4 is marked over *af3* front. At the end of sending when both contacts *z6* and *zb4* in the locking circuit of AF are open, relay AF releases and releases AL.

When relay AF operated, relay ALC is operated over its right winding at contacts *af4* front, and when the time switch T passes through 0 or 120, TD is operated over its left winding to restore its contacts to the positions shown in the drawing and make the time sequence again dependent upon time switch T.

*Change from import to export and vice versa*

The registers shown in Figs. 1 and 2 serve also a meter for recording watts exported. The export meter EM, (Fig. 4B), operates a series of relays, indicated at A', AM', and B'. These relays are similar to those shown in Fig. 2 for the import meter IM. The relay B', however, controls a relay CT instead of the relay C. Theoretically the station should not be importing and exporting at the same time, but in practice it may be doing so but the number of units recorded on either will not be large. When the station shows an excess of one over the other the circuits are changed over to connect contacts of CT in place of contacts of C or vice versa and to send a signal to the central station to that effect.

This is done in the following manner. Condensers QE and QD, Fig. 4C, are charged over contacts $ct4$ back and $c4$ back, respectively. Each time the respective meters record a unit, the condensers QE and QD respectively are connected to condensers QC and QB so that the latter condensers, of larger capacity, accumulate a charge due to several units. At time $T=60$ or 180 relay M operates, and at contacts $m1$, $m2$, $m3$, $m4$ connects condensers QC and QB together. At contacts $m5$, circuit for relay MR was closed. This relay is slow to operate and after an interval closes its contacts $mr1$ and $mr2$. If now condenser QC had the larger charge the left end of resistance YL will be more negative than the right end and a current will flow through this resistance and cause a potential drop across it in such direction as to oppose the positive (ground) potential normally applied over $dr1$ back, YL, $dr2$ back, $d1$ back to the control electrode of the cold cathode tube G, shown. If, on the other hand, QB had the larger charge, the resulting current through resistance YL will give rise to a potential drop aiding the already applied potential. This latter is insufficient to initiate a discharge in the tube, but if the added potential is sufficient the tube will fire and relay DA be operated. Relay DA at contacts $da3$ operates relay D which locks over $d4$ front, and $dz4$ back or $dz5$ back to ground. At contacts $d2$ front, and $da2$ front, relay DR is operated over its left winding and at contacts $dr1$ and $dr2$ reverses the end of resistance YL to which ground potential is applied, and at contacts $dr3$, relay DB is connected to the anode of the tube instead of DA. At contacts $d1$, however, this connection to the grid of the tube is opened for the present. At contacts $s3$ front, $dr5$ front, relay S operates relay DD over its left winding, and contacts $dd1$ (Fig. 4C) now cause impulses from $ct2$ to be registered in place of impulses from $c2$. Contacts $dd2$ (Fig. 4C) cause relay AT to be impulsed from contacts $ct3$ instead of from contacts $c3$. Relay S initiates the sending of a signal to the central station. At contacts $s4$ it operates relay NS Fig. 2 to suppress the sending of the normal code, and at contacts $s1$ it places battery on the lead LA and the sender finder hunts for and finds lead SA2 to which relay DS is connected over $dz2$ back and $s2$ front, and relay DS operates. Lead SA2 is connected in the sender to cause the sending of the same station designation as lead SA1. Contacts $ds2$ front mark wire No. 7 of the multiple to send the first digit of the code. When this has been sent by the sender, ground is applied to lead Z2 and DZ operates. Relay DZ releases DS. Relay DZA operates over $dz3$ front $d3$ front and locks over $dza1$ front and $d3$ front.

When DZ releases due to the release of DS, DZB operates over $dza2$ front, $dz3$ back, $d3$ front and locks over $dza2$ front, $dzb2$ front, $d3$ front. DS is reconnected at lead SA2 and re-operates. Over $ds2$ front, $dr4$ front, $dzb4$, the first wire of the multiple is marked to cause the sender to send one impulse.

The conditions are now such that a change from export to import will operate relay DR to change back its contacts to the positions shown in the drawings and to send a signal to that effect to the central station. In this case, since contacts $dr4$ will be in the position shown, the units digit of the code sent will be two.

What is claimed is:

1. An electro-responsive system for indicating at a central station the state of metering devices producing impulses at a rate corresponding with said state at a power station, comprising in combination with the metering device, at least two impulse counting register devices connected to be operated by the metering device, means for transmitting the recording of the register devices to a receiver at a central station, time period controlled means for sequentially connecting during a number of constant time intervals, one register device to the metering device for recording a number of its states and another of said register devices to the transmitting means for transmitting a number of its readings to the receiver, and means responsive to the rate of producing impulses by the metering device for changing the length of said intervals for another number of meter states and register readings.

2. An electro-responsive system for indicating at a central station the state of metering devices producing impulses at a rate corresponding with said state at a power station, comprising in combination with the metering device, at least two impulse counting register devices connected to be operated by the metering device, means for transmitting the recording of the register devices to a receiver at a central station, and time period controlled means for sequentially connecting during a number of constant time intervals one register device to the metering device for recording a number of its states and another of said register devices to the transmitting means for transmitting a number of its readings to the receiver, said transmitting means including relay circuit connections operative to prevent transmission from a register device when one reading is identical with the previously transmitted reading.

3. A system for indicating at a central station the state of metering devices producing impulses at a rate corresponding with said state at a substation, comprising in combination with the metering device, at least two impulse counting register devices connected to be operated by the metering device, code signal transmitting means for transmitting the recording of the register devices to a receiver at a central station, an interval timer connected to time the signal transmission for longer and shorter intervals including means for sequentially connecting during longer or shorter intervals one register device to the metering device for recording and another register device to the transmitting means for transmitting, and means responsive to the rate of producing impulses by the metering device for changing the time of transmission from longer to shorter and from shorter to longer intervals.

4. A system for indicating at a central station the state of metering devices producing impulses at a rate corresponding with said state at a power station, comprising in combination with the metering device at the power station, at least two impulse counting register devices connected to be operated by impulses of the metering device, signal transmitting circuit means for transmitting the recording of the register devices to a receiver at a central station, time period operating switch means for sequentially connecting during a number of constant time intervals each of the register devices to the metering device for a number of impulse recordings and to the transmitting circuit for periods of time less than said intervals when said register device is not connected to said metering device for transmission of a number of the readings to the receiver, means for changing the length of said intervals from longer to shorter and from shorter to longer intervals, circuit means responsive to the rate of impulses from said metering devices for controlling said changing means to time the signal transmission selectively for longer and shorter periods of operation.

5. An electro-responsive system for indicating at a central station the state of metering devices producing impulses at a rate corresponding with said state at a power station, comprising in a metering circuit two metering devices responsive to export and import loads respectively, a plurality of impulse counting register devices connected to be selectively operated by impulses from each of the meters, signal transmitting circuit means for transmitting the recordings of said register devices to a receiver at a central station, time switch means for successively connecting during a number of constant time intervals each of the register devices to the transmitting circuit for timed intervals of transmission and to the metering circuit for recording, relay controlled circuit connections for controlling the selective operation of such register devices in accordance with the load to change the transmission from the import to export meters, and means responsive to the rate of impulses from said metering devices for varying the length of said intervals in accordance with the load.

6. An electro-responsive system for indicating at a central station the state of metering devices producing impulses at a rate corresponding with said state at a power station, comprising in combination with a metering circuit, a plurality of impulse counting register devices connected to be operated by impulses from said metering circuit, signal transmitting circuit means for transmitting the recordings of the register devices to a receiver at a central station, time switch controlled circuit means for successively connecting during a number of constant time intervals, each of the register devices to the transmitting circuit for timed intervals, while connecting another register device to the metering circuit for recording, a timing switch controlling said circuit means including means responsive to the rate of impulses from said metering devices for changing said timed intervals of transmission to be of longer and shorter periods so as to reduce and to increase respectively the speed of transmission.

7. A system for indicating at a central station the state of metering devices producing impulses at a rate corresponding with said state at a substation, comprising a metering circuit, impulse counting register means connected for recording impulses of the metering circuit, signal transmitting circuit means for transmitting recordings of said register means to a receiver at a central station, one timing means for controlling said connections during predetermined time intervals of longer duration, another timing means for controlling said connections during intervals of shorter duration and means responsive to the rate of impulses from said metering devices for changing over said connections from one timing means to the other timing means in accordance with the state of the metering circuit so as to increase the rate of transmission when the load exceeds a predetermined value.

8. An electro-responsive system of remote meter indication comprising a metering circuit, impulse counting register means connected for recording impulses of the metering circuit, circuit means connected for transmitting the recordings of said register means to a receiver at a central station, timing means for controlling said connections during predetermined time intervals of different lengths including means for changing the length of said intervals and controlled by a state of overload in said metering circuit, and including an alarm circuit controlled by said state of overload to operate the transmission of an alarm code.

9. An electro-responsive system of remote meter indication comprising a metering circuit, impulse counting register means connected for recording impulses of the metering circuit, circuit means connected for transmitting the recordings of said register means to a receiver at a central station, timing means for controlling said connections during predetermined intervals of different lengths including means for changing the length of said intervals, being controlled by a state of overload in said metering circuit, and including an alarm circuit controlled by said state of overload to operate the transmission of an alarm code, said alarm circuit including a retarded discharge condenser and a relay responsive to excessive charging of the condenser.

10. An electro-responsive system for indicating at a central station the state of metering devices producing impulses at a rate corresponding with said state at a power station, comprising in combination with the metering device, at least two impulse counting register devices connected to be operated by the metering device, means for transmitting the recording of the register devices to a receiver at a central station, time period controlled means for sequentially connecting during a number of constant intervals one register device to the metering device for recording a number of its states and another of said register devices to the transmitting means for transmitting a number of its readings to the receiver, said transmitting means including relay circuit connections operative to prevent transmission from a register device when its reading is identical with the previously transmitted reading, means for changing the length of said intervals to change the speed of transmission for another number of meter states and register readings, and means to cause said relay circuit connections to prevent transmission from a register device while said means for changing the length of said intervals is operating.

ERIC MALCOLM SWIFT McWHIRTER.
CYRIL HERBERT CHAMBERS.